US009552395B2

United States Patent
Bayer et al.

(10) Patent No.: US 9,552,395 B2
(45) Date of Patent: Jan. 24, 2017

(54) METHODS, SYSTEMS, AND MEDIA FOR PRESENTING RECOMMENDED MEDIA CONTENT ITEMS

(71) Applicant: Google Inc., Mountain View, CA (US)

(72) Inventors: Jason Bayer, San Francisco, CA (US);
Eric H C Liu, Santa Clara, CA (US);
Calvin Lee, Fremont, CA (US);
Stephen Chau, Palo Alto, CA (US);
Grzegorz Glowaty, Cracow (PL);
Randy Simon, Oakland, CA (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 14/097,557

(22) Filed: Dec. 5, 2013

(65) Prior Publication Data

US 2015/0134653 A1     May 14, 2015

Related U.S. Application Data

(60) Provisional application No. 61/903,390, filed on Nov. 13, 2013.

(51) Int. Cl.
*G06F 17/30*     (2006.01)
*H04N 21/431*     (2011.01)
(Continued)

(52) U.S. Cl.
CPC ........ *G06F 17/3053* (2013.01); *H04N 21/251* (2013.01); *H04N 21/25841* (2013.01);
(Continued)

(58) Field of Classification Search
CPC .............. G06F 17/30401; G06F 17/30867; G06F 17/2785; G06F 17/30023; G06F 17/30041; G06F 17/30044; G06F 17/30424; G06F 17/3053; G06F 17/3087; G06F 17/30654; G06F 17/30038; G06F 17/3005; G06F 17/30265; G06F 17/30477; G06F 17/03; G06Q 30/0631; H04H 60/33; H04N 21/251; H04N 21/252; H04N 21/25891; H04N 21/44222; H04N 21/4532; H04N 21/4667; H04N 21/4668; H04N 21/4756; H04N 21/4826; H04N 21/4828; H04N 21/4524; H04N 21/2665; G10L 15/1822; G10L 15/18; G10L 15/19; G10L 25/54; G06N 99/005; Y10S 707/99933
(Continued)

(56) References Cited

U.S. PATENT DOCUMENTS 5,758,257 A     5/1998     Herz et al.
8,015,006 B2*     9/2011     Kennewick ............ G10L 15/22
                                                                        704/236

(Continued)

FOREIGN PATENT DOCUMENTS

WO     WO/2011/062691     5/2011
WO     WO/2011/102886     8/2011
WO     WO/2012/015631     2/2012

OTHER PUBLICATIONS

Boissiere, G., "Personalized Multicast", Dissertation, Massachusetts Institute of Technology, Jun. 1998, pp. 1-76.
(Continued)

*Primary Examiner* — Dennis Truong
(74) *Attorney, Agent, or Firm* — Byrne Poh LLP

(57) ABSTRACT

In accordance with some implementations of the disclosed subject matter, mechanisms for presenting recommended media content items are provided. In some implementations, a method for providing media guidance is provided, the method comprising: receiving a query from a user; determining search terms from the received query; determining location information corresponding to the user and popular- (Continued)

ity information associated with a plurality of media content items and a plurality of content sources; selecting a media content item from the plurality of media content items based at least in part on the popularity information associated with each of the plurality of media content items and the search terms from the received query, wherein the selected media content item is available from the plurality of content sources; selecting at least one content source from the plurality of content sources based at least in part on the location information associated with the user and the popularity information associated with each of the plurality of content sources; and causing a recommendation interface to be presented to the user, wherein the recommendation interface includes the selected media content item that is provided from the at least one selected content source.

24 Claims, 9 Drawing Sheets

(51) Int. Cl.
H04N 21/462 (2011.01)
H04N 21/482 (2011.01)
H04N 21/25 (2011.01)
H04N 21/258 (2011.01)
H04N 21/466 (2011.01)
H04N 21/485 (2011.01)
H04N 21/81 (2011.01)
H04N 21/84 (2011.01)

(52) U.S. Cl.
CPC ... H04N 21/25891 (2013.01); H04N 21/4314 (2013.01); H04N 21/4622 (2013.01); H04N 21/4668 (2013.01); H04N 21/485 (2013.01); H04N 21/4826 (2013.01); H04N 21/4828 (2013.01); H04N 21/8133 (2013.01); H04N 21/84 (2013.01)

(58) Field of Classification Search
USPC .............. 707/723, 737, 706, 707, 732, 748, 759,707/760, 769, 771, 999.005; 704/257, 9
See application file for complete search history.

(56) References Cited

U.S. PATENT DOCUMENTS

| | | | |
|---|---|---|---|
| 9,020,824 B1* | 4/2015 | Govil ................. | G10L 19/04 704/270 |
| 9,026,516 B1* | 5/2015 | Chapin ............... | G06F 17/3005 707/706 |
| 2006/0095426 A1* | 5/2006 | Takachio ........... | G06F 17/30731 |
| 2007/0033005 A1* | 2/2007 | Cristo ................ | G06F 17/279 704/9 |
| 2008/0263019 A1* | 10/2008 | Harrison ........... | G06F 17/30663 |
| 2009/0006368 A1 | 1/2009 | Mei et al. | |
| 2009/0055385 A1* | 2/2009 | Jeon ................... | H04N 5/44543 |
| 2009/0082037 A1* | 3/2009 | Ju ...................... | G01C 21/3608 455/456.3 |
| 2009/0210898 A1 | 8/2009 | Childress et al. | |
| 2009/0222743 A1 | 9/2009 | Hadfield | |
| 2010/0043040 A1 | 2/2010 | Olsen, Jr. | |
| 2010/0082653 A1* | 4/2010 | Nair .................. | G06F 17/30038 707/759 |
| 2010/0205628 A1* | 8/2010 | Davis ................ | H04M 1/72533 725/25 |
| 2010/0251304 A1 | 9/2010 | Donoghue et al. | |
| 2010/0305848 A1* | 12/2010 | Stallman ............. | G06F 17/3087 701/465 |
| 2012/0059825 A1* | 3/2012 | Fishman ............ | G06F 17/30053 707/737 |
| 2012/0079429 A1* | 3/2012 | Stathacopoulos . | G06F 17/30979 715/830 |
| 2012/0102021 A1 | 4/2012 | Hill et al. | |
| 2012/0117017 A1 | 5/2012 | Phillips et al. | |
| 2012/0239443 A1* | 9/2012 | Miller ................. | G06F 17/2785 705/6 |
| 2012/0266060 A1* | 10/2012 | Roberts ............. | G06F 17/30905 715/234 |
| 2012/0291072 A1* | 11/2012 | Maddison ........... | G06F 17/3087 725/53 |
| 2013/0007792 A1 | 1/2013 | Jeon et al. | |
| 2014/0081633 A1* | 3/2014 | Badaskar .......... | G06F 17/30023 704/235 |
| 2014/0281971 A1* | 9/2014 | Isbell, III .......... | G06F 17/30053 715/716 |
| 2014/0365517 A1* | 12/2014 | Calo .................. | G06F 17/30401 707/760 |
| 2015/0052128 A1* | 2/2015 | Sharifi .............. | G06Q 30/0631 707/727 |
| 2015/0100562 A1* | 4/2015 | Kohlmeier .......... | G06F 17/3053 707/706 |

OTHER PUBLICATIONS http://www.quickmeme.com/make, "Quickmeme", Quickmeme.com, pp. 1-4, downloaded on May 25, 2012.
http://zipmeme.com/generator, "Zipmeme", Zipmeme.com, pp. 1-3, downloaded on May 25, 2012.
https://play.google.com/store/apps/details?id=com.zombodroid.MemeGenerator, "Meme Generator", ZomboDroid, pp. 1-2, downloaded on May 25, 2012.
Adomavicius, G. et al., "Toward the Next Generation of Recommender Systems: A Survey of the State-of-the-Art and Possible Extensions", In IEEE Transactions on Knowledge and Data Engineering, vol. 17, No. 6, Jun. 1, 2006, pp. 734-749.
International Search Report & Written Opinion of the International Search Authority dated Feb. 12, 2015 in International Patent Application PCT/US2014/065284.
International Search Report dated Jan. 26, 2015 in International Patent Application No. PCT/US2014/065276.
Office Action dated Feb. 13, 2015 in U.S. Appl. No. 14/095,095.
Office Action dated Jul. 23, 2015 in U.S. Appl. No. 14/095,095.
Office Action dated Dec. 17, 2015 in U.S. Appl. No. 14/095,095.
Written Opinion of the International Search Authority dated Jan. 26, 2015 in International Patent Application No. PCT/US2014/065276.
Yu, Z. et al., "Supporting Context-Aware Media Recommendations for SMart Phones", In IEEE Pervasive Computing, vol. 5, No. 3, Jul. 1, 2006, pp. 68-75.

* cited by examiner

METHODS, SYSTEMS, AND MEDIA FOR PRESENTING RECOMMENDED MEDIA CONTENT ITEMS

CROSS-REFERENCE TO RELATED APPLICATIONS

This application claims the benefit of U.S. Provisional Patent Application No. 61/903,390, filed Nov. 13, 2013, which is hereby incorporated by reference herein in its entirety.

TECHNICAL FIELD

The disclosed subject matter relates to methods, systems, and media for presenting recommended media content items.

BACKGROUND

There is an overwhelming volume of media content that is available to the average consumer. More particularly, there are many applications that a consumer can use on a television or set-top box that allow the consumer to consume media content from various sources. For example, a consumer can select between media content that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers.

As the number of sources continues to increase (e.g., additional over-the-top providers of on-demand content), media guidance becomes increasingly important. For example, prior to making a decision on which media content to view, the consumer is generally required to select which content source to access either by running a particular application or accessing a particular section in an application.

Accordingly, mechanisms for presenting recommended media content items are provided.

SUMMARY

In accordance with some implementations of the disclosed subject matter, mechanisms for presenting recommended media content items are provided.

In accordance with some implementations of the disclosed subject matter, a method for providing media guidance is provided, the method comprising: receiving a query from a user; determining search terms from the received query; determining location information corresponding to the user and popularity information associated with a plurality of media content items and a plurality of content sources; selecting a media content item from the plurality of media content items based at least in part on the popularity information associated with each of the plurality of media content items and the search terms from the received query, wherein the selected media content item is available from the plurality of content sources; selecting at least one content source from the plurality of content sources based at least in part on the location information associated with the user and the popularity information associated with each of the plurality of content sources; and causing a recommendation interface to be presented to the user, wherein the recommendation interface includes the selected media content item that is provided from the at least one selected content source.

In accordance with some implementations of the disclosed subject matter, a system for providing media guidance is provided. The system comprising a hardware processor that is configured to: receive a query from a user; determine search terms from the received query; determine location information corresponding to the user and popularity information associated with a plurality of media content items and a plurality of content sources; select a media content item from the plurality of media content items based at least in part on the popularity information associated with each of the plurality of media content items and the search terms from the received query, wherein the selected media content item is available from the plurality of content sources; select at least one content source from the plurality of content sources based at least in part on the location information associated with the user and the popularity information associated with each of the plurality of content sources; and cause a recommendation interface to be presented to the user, wherein the recommendation interface includes the selected media content item that is provided from the at least one selected content source.

In accordance with some implementations of the disclosed subject matter, a non-transitory computer-readable medium containing computer-executable instructions that, when executed by a processor, cause the processor to perform a method for providing media guidance, is provided. The method comprising: receiving a query from a user; determining search terms from the received query; determining location information corresponding to the user and popularity information associated with a plurality of media content items and a plurality of content sources; selecting a media content item from the plurality of media content items based at least in part on the popularity information associated with each of the plurality of media content items and the search terms from the received query, wherein the selected media content item is available from the plurality of content sources; selecting at least one content source from the plurality of content sources based at least in part on the location information associated with the user and the popularity information associated with each of the plurality of content sources; and causing a recommendation interface to be presented to the user, wherein the recommendation interface includes the selected media content item that is provided from the at least one selected content source.

In accordance with some implementations of the disclosed subject matter, a system for providing media guidance is provided. The system comprising: means for receiving a query from a user; means for determining search terms from the received query; means for determining location information corresponding to the user and popularity information associated with a plurality of media content items and a plurality of content sources; means for selecting a media content item from the plurality of media content items based at least in part on the popularity information associated with each of the plurality of media content items and the search terms from the received query, wherein the selected media content item is available from the plurality of content sources; means for selecting at least one content source from the plurality of content sources based at least in part on the location information associated with the user and the popularity information associated with each of the plurality of content sources; and means for causing a recommendation interface to be presented to the user, wherein the recommendation interface includes the selected media content item that is provided from the at least one selected content source.

In some implementations, the system further comprises: means for extracting location terms and timing terms as search terms from the received query; and means for searching through the plurality of media content items for media content items that match the extracted location terms and the extracted timing terms.

In some implementations, the system further comprises: means for ranking the matching media content items based at least in part on the associated popularity information; and means for selecting a subset of the matching media content items based on the ranking.

In some implementations, the recommendation interface includes the subset of the matching media content items and wherein each of the media content items in the subset of the matching media content items is selectable by the user.

In some implementations, the system further comprises means for determining a subset of the plurality of content sources for providing the selected media content item, wherein the subset of the plurality of content sources includes live content sources that are available to the user based on the location information and the associated popularity information.

In some implementations, the system further comprises means for determining a subset of the plurality of content sources for providing the selected media content item, wherein the subset of the plurality of content sources includes on-demand content sources that are available to the user based on one or more of the associated popularity information, applications installed on a device associated with the user, and historical information associated with the user.

In some implementations, the system further comprises means for determining a subset of the plurality of content sources for providing the selected media content item, wherein the subset of the plurality of content sources includes on-demand content sources that are available to the user having an external streaming media device.

In some implementations, the system further comprises means for determining a subset of the plurality of content sources for providing the selected media content item, wherein the subset of the plurality of content sources includes on-demand content sources that are available based on applications associated with media devices that are at or near the location information associated with the user.

In some implementations, the system further comprises: means for extracting device terms from the received query; and means for searching through the plurality of media content items for matching media content items that are provided by a media device corresponding to the device terms in the received query.

In some implementations, the recommendation interface includes one or more recommendation reasons that the media content item was selected for the user.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
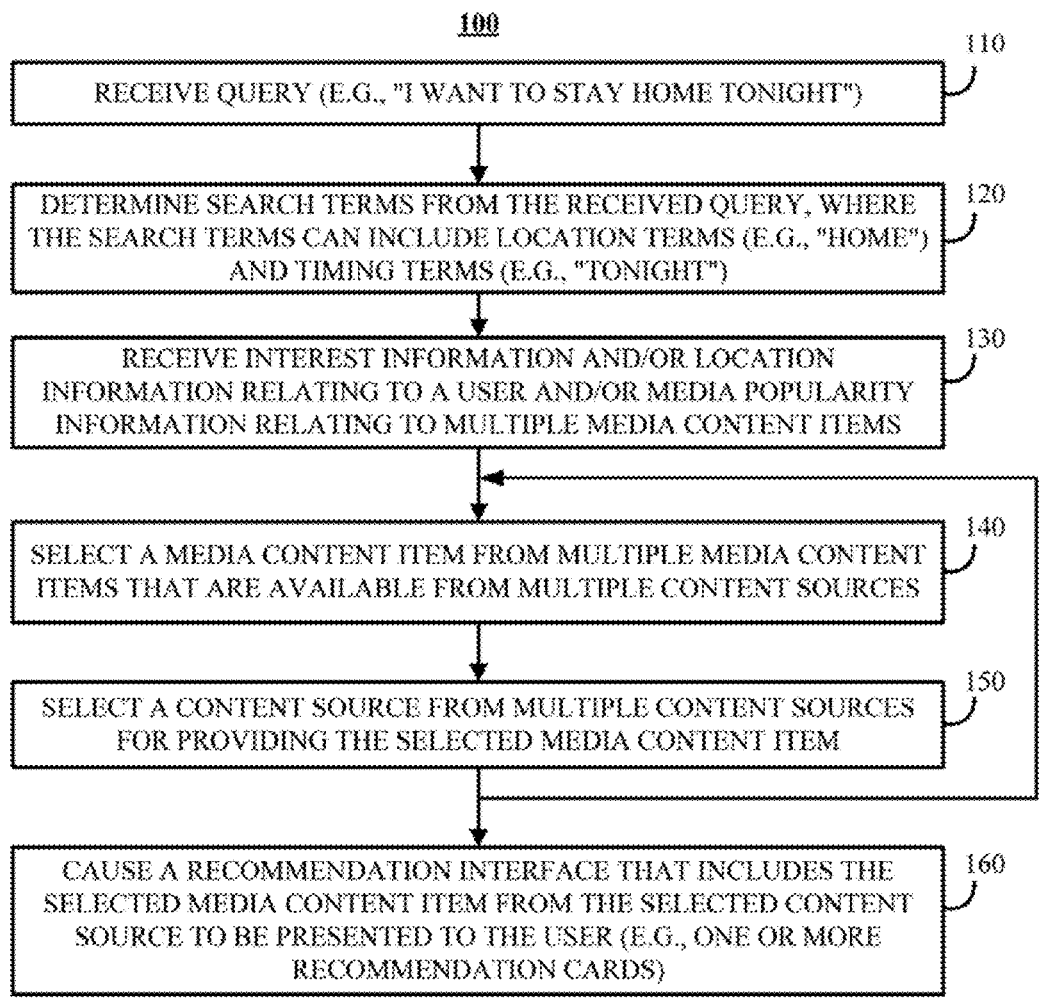
FIG. 1 is a flowchart of an illustrative process for providing media guidance with media content items from various sources using one or more recommendation interfaces in accordance with some implementations of the disclosed subject matter.

In accordance with various implementations, as described in more detail below, mechanisms, which can include systems, methods, and computer-readable media, for presenting recommended media content items are provided.

Generally speaking, a recommended media content item from a recommended media content source can be provided in a recommendation interface. For example, multiple recommendation interfaces can be concurrently presented to the user, where each recommendation interface can provide a relevant, contextual media content item that the user is likely to be interested in consuming and where each recommendation interface can be provided from one or more recommended content sources that are available to the user. In another example, a recommendation interface in the form of a lure interface that includes multiple recommended content items can be presented to the user. Such a recommendation interface can include a recommended media content item, information relating to the recommended media content item (e.g., a title, a rating, a brief description, a running time, a start time and an end time, etc.), and an option to obtain the recommended media content item from a recommended content source.

In some implementations, recommended media content items can be selected from multiple media content items based on popularity information. For example, the mechanisms can determine which media content items to recommend by ranking the media content items based on popularity information and selecting media content items based on their ranking. For media content items that have a number of episodes in a series, the mechanisms can determine a particular episode in a particular series for recommending to the user based on popularity information and/or interest information (e.g., how likely the user is to be interested in the media content). In a more particular example, recommended media content items can be selected based on popularity information and location information for the user (e.g., popular media content items in the user's location).

It should be noted that, in some implementations, prior to selecting a recommended media content item for providing the recommended media content item, the mechanisms can receive a query from the user. For example, the user can launch a client application on a mobile device and provide an input, such as "I want to stay at home tonight and watch something." The mechanisms can extract search terms from the provided input that includes, for example, location information (e.g., "home") and timing information (e.g., "tonight"). In response to extracting these search terms, the mechanisms can determine which media content items match the location information (e.g., which media content items are available at the location information associated with the user) and/or match the timing information (e.g., which media content are available to the user at that particular time).

It should also be noted that, in some implementations, the mechanisms can provide a recommendation reason, such as "Popular," along with the recommended media content item within a recommendation interface.

In some implementations, recommended media content items can be available from multiple content sources, such as an over-the-top content source, a video-on-demand content source, a live television content source, etc. The mechanisms can select a content source from the multiple content sources for providing the recommended media content item using any suitable criterion. For example, the mechanisms can determine a content source that the user is likely to have access. For live television content sources, the mechanisms can select content sources, such as television channels, based on popularity information and location information. For on-demand content sources, the mechanisms can select content sources, such as over-the-top content sources, based on popularity information, applications that have been installed on a user device, and/or user interest information. Additionally or alternatively, the mechanisms can determine whether the recommended media content item can be presented on the user device by installing a media playback application or subscribing to a service associated with a content provider and, in response, prompting the user to install the media playback application or subscribe to the service. Additionally or alternatively, the mechanisms can determine whether the recommended media content item can be presented to the user using an external streaming media device (e.g., a streaming media device connected to the user device through a local area network).

In some implementations, the recommended content item provided by a selected content source can be presented as a recommendation interface. In a more particular example, the recommendation interface can be presented as a recommendation card or any other suitable user interface that presents information to the user. In this example, a user can load a client application on a mobile device, where the client application presents the user with an opportunity to interact with one or more cards that include, among other things, recommended content items from selected content sources.

Although the implementations described herein generally relate to presenting a user with a recommendation interface, such as a recommendation card in a recommendation application executing on a mobile device, this is merely illustrative. For example, the recommendation application can be implemented on a television platform. In response to receiving a query from the user via a microphone or other suitable user input device connected to a television device, the recommendation application executing on the television device can provide the user with recommended media content items that are available to the user—e.g., media content items that may interest the user based on interest information, such as past selections, and location information associated with the television device and are available through one or more sources (e.g., by tuning to a channel, by initiating a media playback application installed on the television device, by prompting the user to install a media playback application on the television device, or using media devices connected to the television device). In another example, the application can provide the user with different recommendation interfaces, where a lure interface can be presented to the user that includes information on multiple recommended media content items and, in response to selecting a portion of the lure interface, a number of recommendation interfaces can be presented that include information and playback options for the recommended media content items on the lure interface.

Turning to FIG. 1, FIG. 1 is a flow chart of an illustrative process 100 for providing media guidance with media content items from various sources using one or more recommendation interfaces in accordance with some implementations of the disclosed subject matter.

Process 100 can begin by receiving a query from a user at 110. Such a query can be received from the user by any suitable approach, such as a voice search or a text search provided by the user through a computing device. In a more particular example, the user can initiate a client application on a mobile device that provides content recommendations and, in response to initiating the client application, the user is provided with an opportunity to transmit a query, such as "I want to stay home tonight and watch something."

In response to receiving the query at 110, process 100 can determine search terms from the received query at 120. For example, in response to receiving the search query "I want to stay home tonight and watch something," process 100 can segment the query to obtain search terms, such as "stay home," "home," "tonight," "watch something," and "watch." Process 100 can then determine whether one or more of the search terms fall into particular categories, such as timing terms (e.g., "tonight"), location terms (e.g., "stay home" and "home"), and/or action terms (e.g., "watch"). It should be noted that any suitable terms can be extracted from the query (e.g., a content type of "movie" or "television"). For example, a device term can be extracted from the query, such as "my CAST-enabled device" from the query "Romantic comedy to watch on my CAST-enabled device."

It should be noted that, in some implementations, process 100 can input the query or segments of the query into a dictionary of words or phrases such that the search terms can be restricted to the words or phrases in the dictionary.

In some implementations, process 100 can receive information relating to the user that provided the query at 130. The received information can include any suitable information regarding a user's location, and, in some implementations, can additionally or alternatively indicate interactions with types of media content or times of media content viewing. As a particular example, the received information can indicate that a user is currently at home and is therefore likely to want to watch media content. As another particular example, process 100 can determine location information from a user profile, user preferences, search history, etc. For example, process 100 can determine from a user account associated with a mobile device includes a location that the user has designated as a home location. In another example, process 100 can determine from email information and/or search history information (e.g., associated with a user account on the mobile device) an approximate location of the media device. In some implementations, the location information determined from a mobile device associated with the user can include coordinates such as coordinates derived using the Global Positioning System (GPS), and/or approximate coordinates such as coordinates derived using multilateration techniques (e.g., triangulation of radio signals from a known radio source, such as a wireless base station), or the like.

In instances where a user consents to the use of data regarding the user's location, such data can be used to create recommendation cards or suitable interfaces suggesting media content items in accordance with some implementations. In some implementations, the user's location used for presenting recommended media content items can be limited to products provided by the company presenting the cards or interfaces (e.g., limited to a particular search query interface, limited to a particular e-mail client, and/or any other particular products). Additionally or alternatively, in some implementations, a user can be required to sign into an account before user location information can be used to present recommended media content items.

In some implementations, the received information can include any suitable information regarding a user's interests and media preferences. For example, the received information can indicate a user's preference based on past behavior (e.g., past media content selections). It should be noted that, in some implementations, a user can specify that certain types of activity or information that should or should not be considered when presenting a card or interface with recommended media content items. For example, in some implementations, a user can specify that recommendation interfaces should only be presented based on, for example, search queries, previously streamed media content, and/or any other type of activity. As another example, in some implementations, a user can specify that certain types of activity, for example, reading or responding to an e-mail, browsing history, and/or any other type of activity, should not be considered when presenting an interface with recommended media content items.

In some implementations, the received information can include popularity information relating to media content items. For example, the received information can indicate the popularity of a particular item of media content and their popularity can be based on past ratings or rankings (e.g., ratings, reviews, or any other indicator of popularity). As a particular example, the received information can indicate that the media content item was the most-watched television program in the country during the past week. As another example, the received information can indicate current trends of media content popularity, e.g., based on topics discussed on one or more social media networks.

It should be noted that, in situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Alternatively, in some implementations, process 100 can receive interest information, location information, and/or popularity information without receiving a query from the user. For example, in response to initiating the client application on the computing device, process 100 can receive such information. In a more particular example, in response to initiating the client application on a mobile device, process 100 can receive location information relating to a user and popularity information relating to multiple media content items without receiving a voice query from the user.

In some implementations, process 100 can select a media content item from multiple media content items at 140, where the selected media content item is available to be provided from one or more content sources. For example, the media content item can be selected based on the received interest information, the location information, and the popularity information. As described above, the media content items can be selected based on location terms and timing terms within a search query.

In some implementations, when the media content item has multiple episodes in a series, process 100 can select the episode that is likely to be interesting to the user. For example, a particular episode of a particular season can be selected based on popularity information (e.g., the most popular episode that aired in a given month). In another example, a particular episode of a particular season can be selected based on any other suitable criterion, such as a user's past media content selections (e.g., a subsequent episode that a user has not yet watched).

In some implementations, when the received search query includes device terms or application terms, process 100 can select media content items from multiple media content items based on available through media devices or media applications corresponding to the terms in the search query. For example, in response to receiving the query "Romantic comedy on my CAST-enabled device," process 100 can select media content items that are available through the CAST-enabled device indicated in the search query and select a subset of those media content items based on popularity information. In examples where a user has consented to the detection of nearby devices proximal to the user's device, process 100 can indicate the presence of one or more nearby devices that may be suitable for presenting media content in response to receiving the search query.

Figure 2:
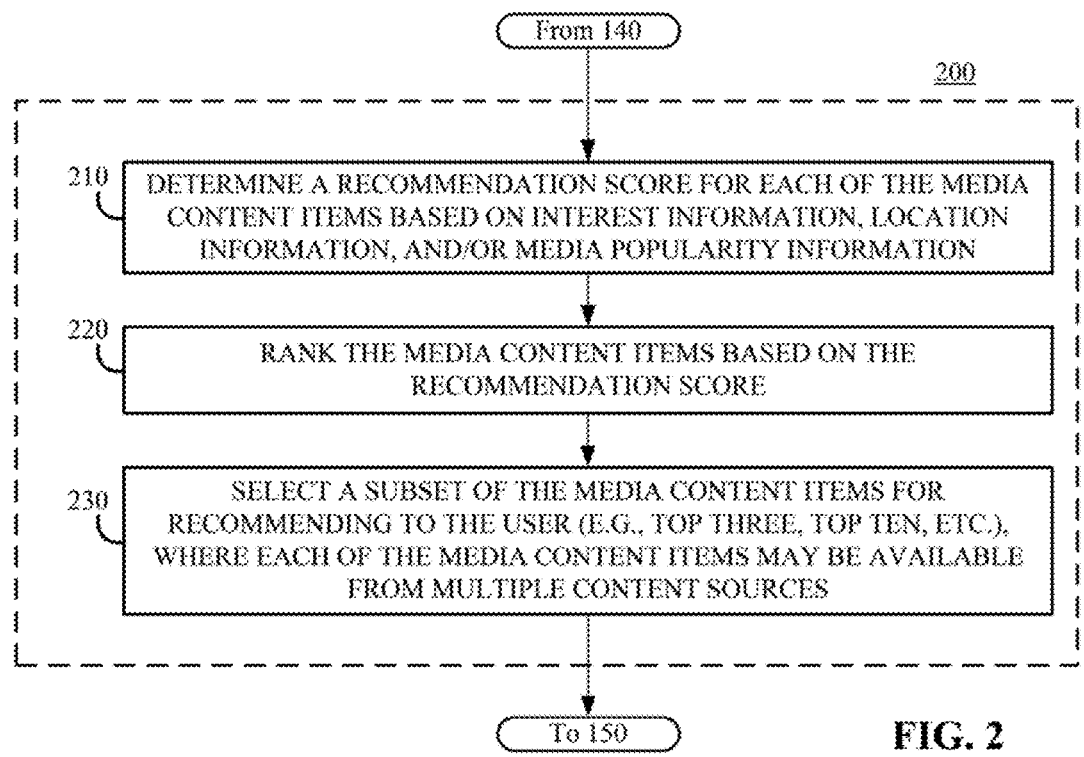
FIG. 2 is a flowchart of an illustrative process for selecting a recommended media content item from multiple media content items in accordance with some implementations of the disclosed subject matter.

A more particular example of selecting a media content item from multiple media content items is shown in FIG. 2. As shown, process 200 begins by determining a recommendation score for each of the media content items based on interest information, location information, and/or media popularity information. For example, each piece of received information can be scored and weighted on any suitable scale, and the resulting weighted scores can be combined in any suitable way to determine a recommendation score for each of the media content items. In some implementations, any combination of any suitable machine learning or statistical techniques, including linear combinations, neural networks, classification algorithms, recommender systems, Bayesian statistics, and/or any other suitable techniques can be used to generate a recommendation score for each of the media content items.

Upon determining a recommendation score for each of the media content items, process 200 can rank the media content items based on the recommendation score at 220. At 230, process 200 can select a subset of the media content items for recommending to the user. For example, the top ten media content items can be inserted into recommendation interfaces that are presented to the user.

Referring back to FIG. 1, for the selected media content item, process 100 can select a content source from multiple content sources for providing the media content item. For example, the selected media content item can be provided by a live television content provider, by one or more over-the-top content providers, by one or more on-demand content providers, a digital video recorder, or any other suitable content source. In a more particular example, process 100 can determine the content providers that the user is likely to have access to using various criterion.

Figure 3:
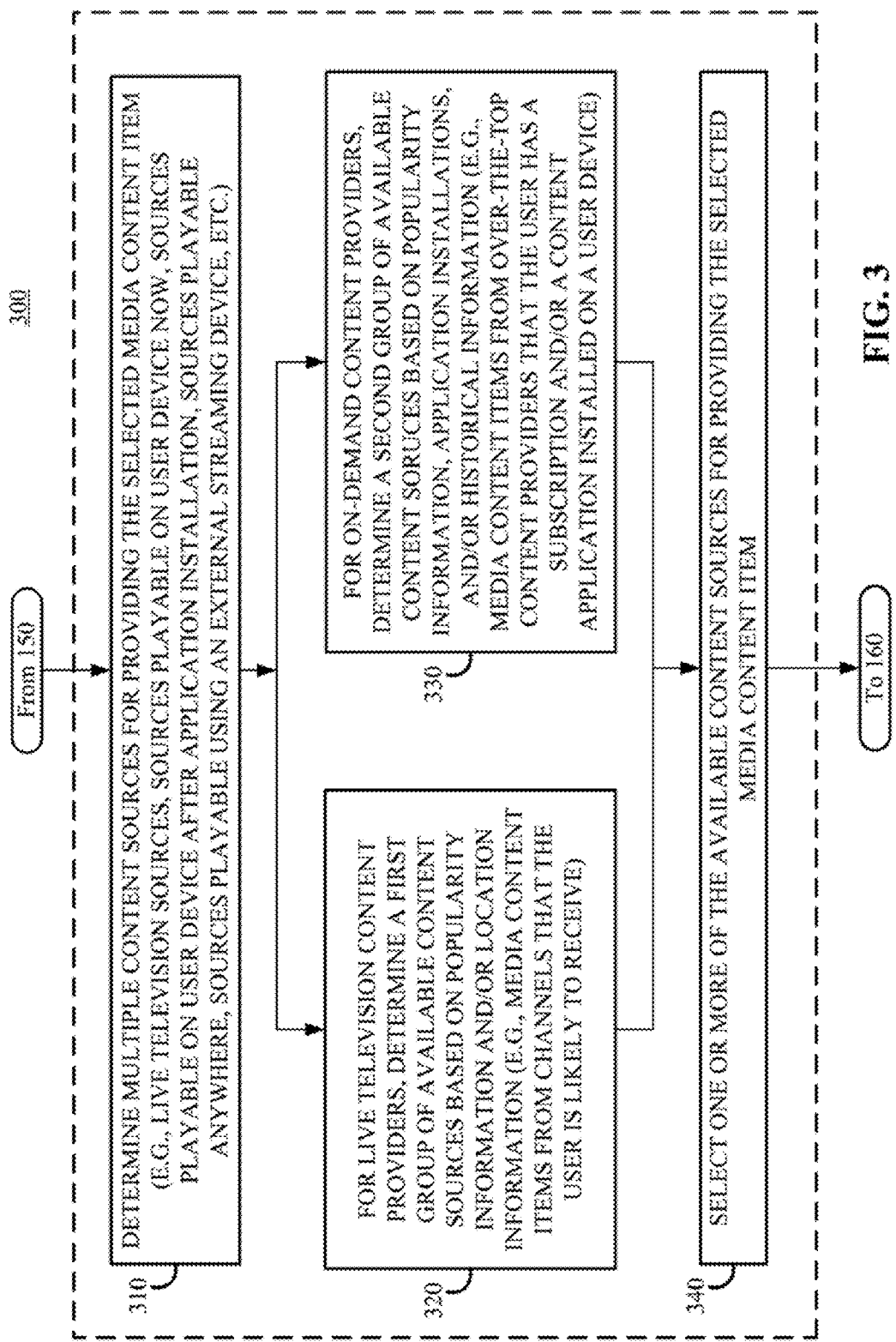
FIG. 3 is a flowchart of an illustrative process for selecting a recommended content source from multiple content sources in accordance with some implementations of the disclosed subject matter.

A more particular example of selecting a content source from multiple content sources is shown in FIG. 3. As shown, at 310, process 300 can determine that there are multiple content sources for providing the selected media content item.

In some implementations, for live television content sources at 320, process 300 can determine available content sources based on popularity information and/or location information. For example, based on the user's location information, process 300 can determine the television channels that the user is likely to receive. In a more particular example, process 300 can determine a subset of television channels that the user is likely to receive by excluding particular channels, such as premium channels. In another more particular example, process 300 can determine television channels that the user at a particular location is likely to receive, sort those television channels based on popularity information, and select a subset of those television channels based on their popularity information (e.g., the top twenty television channels that the user is likely to receive and that the user is likely to watch).

In some implementations, process 300 can allow a user of a computing device to configure available content sources by disabling particular channels. For example, process 300 can receive a voice command from the user of the computing device (e.g., "I do not get Channel XYZ" or "I do not want to see recommendations on Channel XYZ"). In another example, process 300 can receive a user interaction with a recommendation interface and, in response to the user interaction, disable particular channels. In a more particular example, in response to launching a client application on a mobile device, the user can be provided with a recommendation interface that recommends a particular media content item that is playing at a particular time on channel XYZ and, in response to the user dismissing or otherwise removing the recommendation interface, the channel associated with the removed recommendation interface can be disabled or excluded from future recommendation interfaces.

It should be noted that, in some implementations, process 300 can differentiate between different voice inputs or text inputs, such as "I do not want to see programs on Channel XYZ" versus "I do not have a subscription to watch programs on Channel XYZ." For example, as described in connection with the query interpretation features above, the terms can be parsed and interpreted to differentiate between the user not currently having a subscription to a content provider and the user not being interested in recommendations from a particular content provider. In this example, in response to not having a subscription, process 300 can provide the user with an opportunity to subscribe to a particular content provider in order to be provided with a particular media content item. Similarly, in response to not having a subscription and in response to determining that another content source is available to the user, process 300 can provide the user with a recommendation interface that includes an option to playback the media content item from the available content source.

In some implementations, for on-demand content sources at 330, process 300 can determine available content sources based on popularity information, application installations, and/or historical information. For example, in response to a user of a mobile device launching a client application, the client application can determine device information that includes applications that have been installed on the mobile device. In response, process 300 can determine content sources that are playable on the mobile device at this point in time (e.g., based on application installations).

Additionally or alternatively, process 300 can determine content sources that are playable on the mobile device by installing an application or by subscribing to a content provider. In response, recommendation interfaces can be presented to the user that prompt the user to install an application available from an application marketplace or that prompt the user to subscribe to a content provider.

Additionally or alternatively, in some implementations, process 300 can detect other devices connected to the mobile device. For example, the client application on the mobile device can perform a particular discovery protocol to detect other media devices connected on a local area network. In response to detecting that a streaming media device is available to playback media content, process 300 can determine content sources that are playable on a connected media device, such as an external streaming media device. As such, a recommendation interface can be presented to the user that instructs the connected media device to obtain and present a recommended media content item.

In a more particular example, process 300 can detect the presence of particular devices that are at or near the user's location, such as CAST-enabled devices. In response to detecting a CAST-enabled device, a recommendation interface can be presented to the user that includes a selectable icon or element that instructs a particular application to initiate a session for presenting the media content corresponding to the recommendation interface.

In some implementations, process 300 can receive information relating to email and/or browser history associated with a user of a computing device to determine which on-demand sources are available to the user.

In some implementations, process 300 can allow a user of a computing device to configure available content sources by disabling particular on-demand sources. For example, process 300 can receive a voice command from the user of the computing device (e.g., "I do not want to see recommendations from provider A" or "I do not have a subscription to provider A"). In another example, process 300 can receive a user interaction with a recommendation interface and, in response to the user interaction, disable particular on-demand content sources. In a more particular example, in response to launching a client application on a mobile device, the user can be provided with a recommendation interface that recommends a particular media content item that is available from a particular on-demand content source and, in response to the user dismissing or otherwise removing the recommendation interface, the on-demand content source associated with the removed recommendation interface can be disabled or excluded from future recommendation interfaces. In some implementations, the client application can prompt the user to indicate whether further recommendation interfaces should exclude the particular on-demand content source.

In some implementations, process 300 can determine device information associated with a user device, such as device characteristics, and determine the ability for a content source to provide media content to the user device. For example, in response to determining that a user having a mobile device may have particular streaming media capabilities, content sources that can use such streaming media capabilities can be included in the group of available content sources.

Upon determining available content sources at 320 and 330, process 300 can select one or more of the available content sources for providing the selected media content item at 340. For example, based on popularity of the content providers, process 300 can further select one available television service provider that provides a selected media content item at a particular time on a particular television channel and one available on-demand provider that provides the selected media content item.

Referring back to FIG. 1, it should be noted that 140 and 150 can be repeated for multiple media content items. For example, process 100 can select an additional media content item and determine which content source or content sources to provide the additional media content item.

In response to selecting a recommended media content item that is available from a selected content source, process 100 can cause a recommendation interface to be presented to the user. In a more particular example, the recommendation interface can be presented as a recommendation card or any other suitable user interface that presents information to the user. In this example, a user can load a client application on a mobile device, where the client application presents the user with an opportunity to interact with one or more cards that include, among other things, recommended content items from selected content sources.

Figure 4:
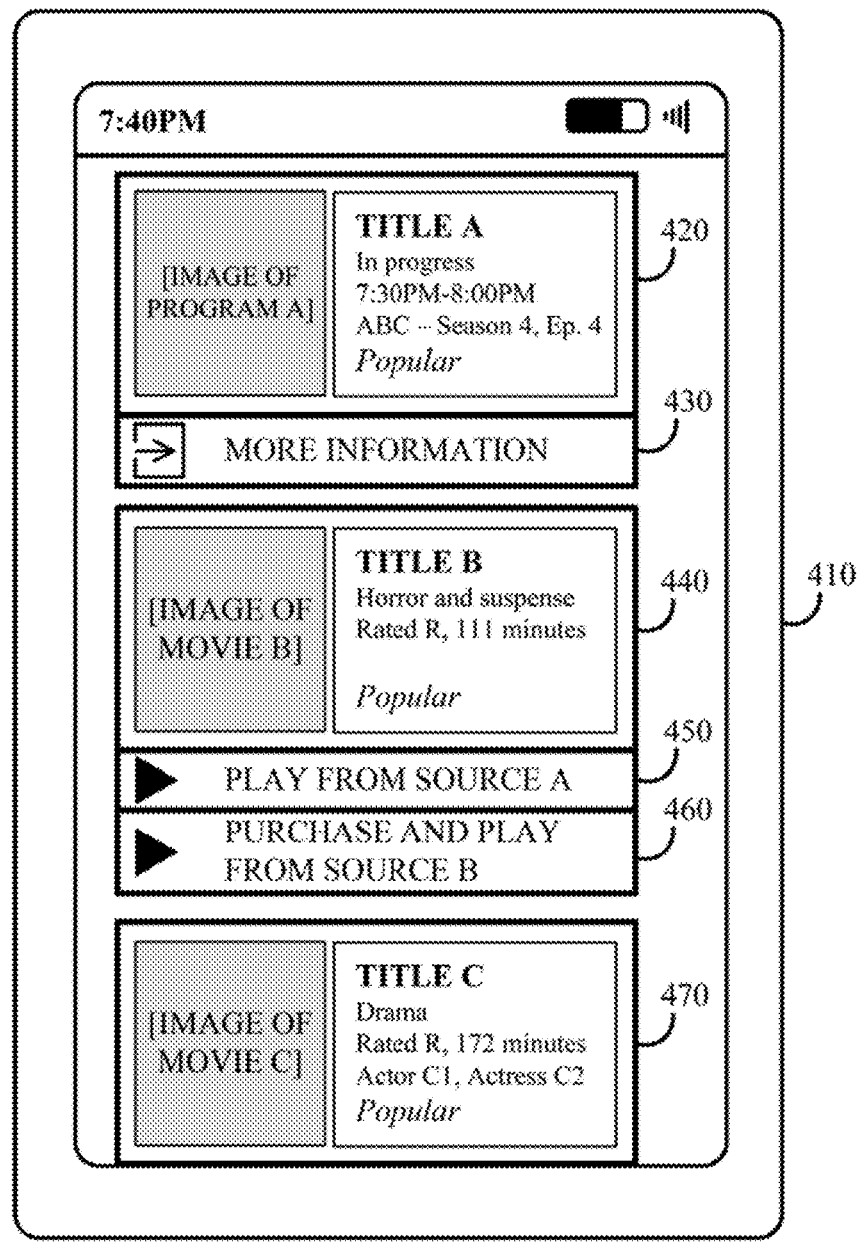
FIG. 4 is an illustrative screen of recommended content items in the form of recommendation interfaces, where a recommendation reason and one or more available content sources are provided with each recommended content item, in accordance with some implementations of the disclosed subject matter.

For example, FIG. 4 shows an illustrative screen of recommended content items in the form of recommendation interfaces, where a recommendation reason and one or more available content sources are provided with each recommended content item, in accordance with some implementations of the disclosed subject matter. As shown, in some implementations, a mobile device 410 can present interface 400 that includes recommendation interfaces 420, 440, and 470, where each recommendation interface includes a recommended media content item and information related to the recommended media content item. Such information can include, a title, an image or screenshot of the media content item, a status identifier (e.g., "In progress"), a channel or source identifier, a start time and end time, a running time, genre information, a season number, an episode number, a brief description, actor information, or any other suitable information describing the media content item.

It should also be noted that, in some implementations, a recommendation reason, such as "Popular," can be presented within a recommendation interface along with the recommended media content item. For example, as shown in FIG. 4, each of the recommendation interfaces 420, 440, and 470 have been selected for the user based on popularity information. As such, the term "Popular" is presented with each recommendation interface.

As also shown in FIG. 4, each recommendation interface provides the user with options for interacting with the recommended media content item. For recommendation interface 420, option 430 can be presented that, when selected, can provide the user with additional information relating to the recommended media content item. In response to selecting a portion of recommendation interface 420, the computing device can be instructed to present the media content item (e.g., Program A) by tuning to a particular television channel. For recommendation interface 440, option 450 can be presented that, when selected, can provide the media content item from a particular content source (e.g., Source A). In addition, option 360 can be presented that, when selected, can provide the user with an opportunity to purchase the media content item from a particular content source (e.g., Source B) and initiate playback.

Although not shown in FIG. 4, in some implementations, recommendation cards or interfaces can be interacted with by a user. For example, a card can be removed from user interface 400 if a user is not interested or is no longer interested in the information presented on the card. As another example, a card can be "selected" to perform an action or present more information. As a more particular example, if a card which displays a recommended media content item available from a particular content source is presented, the card can be selected, and in response, an action can be performed, for example, access the particular content source or an application associated with the particular content source to obtain and playback the media content item. Cards can be interacted with in any suitable way. For example, in some implementations, cards can be dismissed by clicking or tapping on the card or on a "dismiss" icon (e.g., an "X" at the corner of the card or any other suitable icon). As another particular example, in some implementations, cards can be dismissed by "swiping" or "dragging" the card off the border of user interface 400. Similarly, cards can be selected by clicking, tapping, or any other suitable mechanism.

Figure 5:
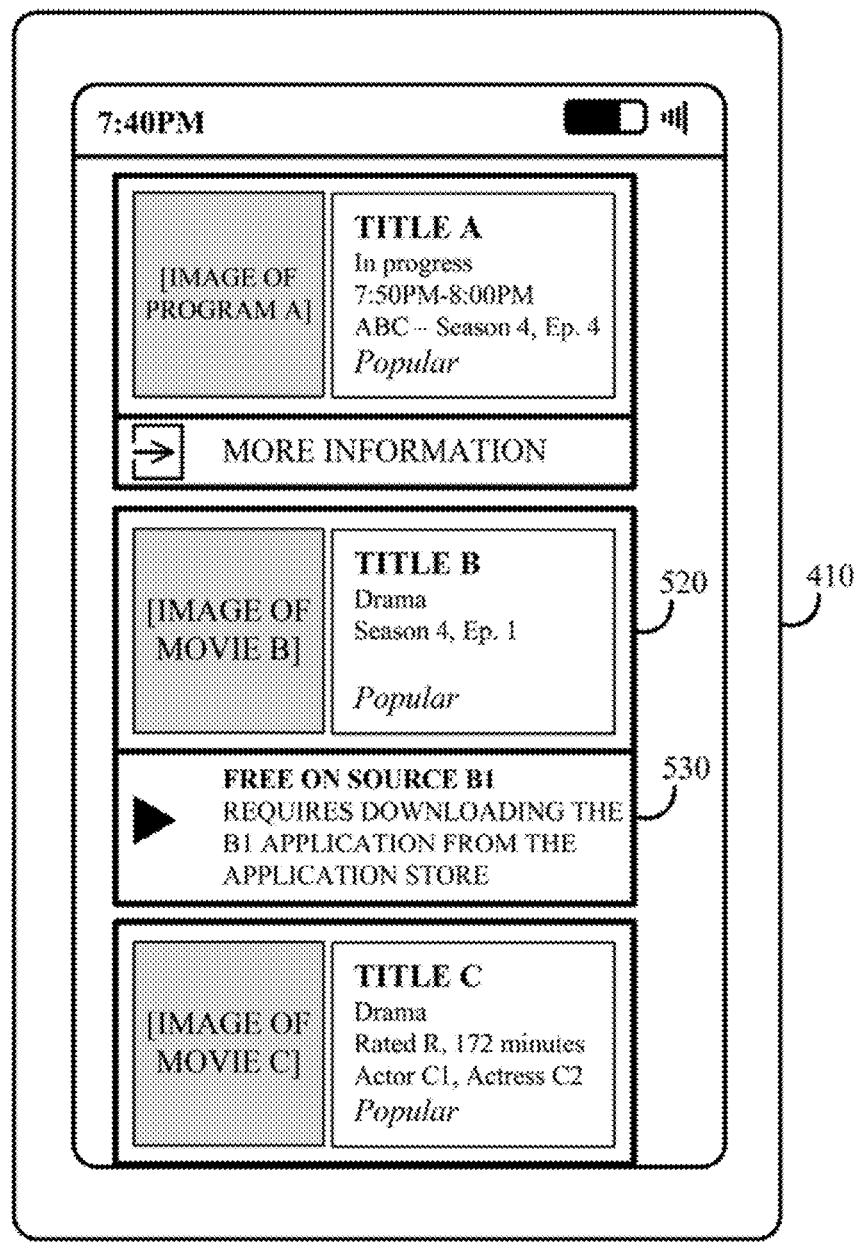
FIG. 5 is an illustrative screen of recommended content items in the form of recommendation interfaces, where content availability information that prompts the user to install an application associated with a content provider or subscribe to a content provider is provided with a recommended content item, in accordance with some implementations of the disclosed subject matter.

In some implementations, recommendation interfaces can include suggested content sources. For example, as described above, a client application can suggest that the user install an application from an application marketplace or place a subscription such that a particular media content item can be presented to the user. For example, FIG. 5 shows an illustrative screen of recommended content items in the form of recommendation interfaces, where content availability information that prompts the user to install an application associated with a content provider or subscribe to a content provider is provided with a recommended content item, in accordance with some implementations of the disclosed subject matter. As shown, recommendation interface 520 for a particular movie (e.g., movie B) is presented with option 530 that prompts the user to download an application from an application store. In response to selecting option 530, the client application can direct the computing device to the application store and initiate downloading the application associated with the content source for obtaining the particular movie.

In some implementations, recommendation interfaces can include content sources for media devices that are connected to the computing device executing the processes described above. For example, in response to initiating the client application, the computing device can determine media devices that are connected to the computing device on a local area network (e.g., television devices, streaming media devices, etc.). In a more particular example, in response to initiating the client application, the computing device can execute a full discovery protocol on the network for determining the details of any media devices found on the current network. The full discovery protocol can include transmitting a multicast message to all devices on the network requesting device details from the devices on the network. Additionally, the multicast message can be addressed to certain types of devices and/or can be compatible with a discovery protocol for devices that comply with a particular standard (e.g., Universal Plug and Play (UPnP), Digital Living Network Alliance (DLNA), etc.).

Figure 6:
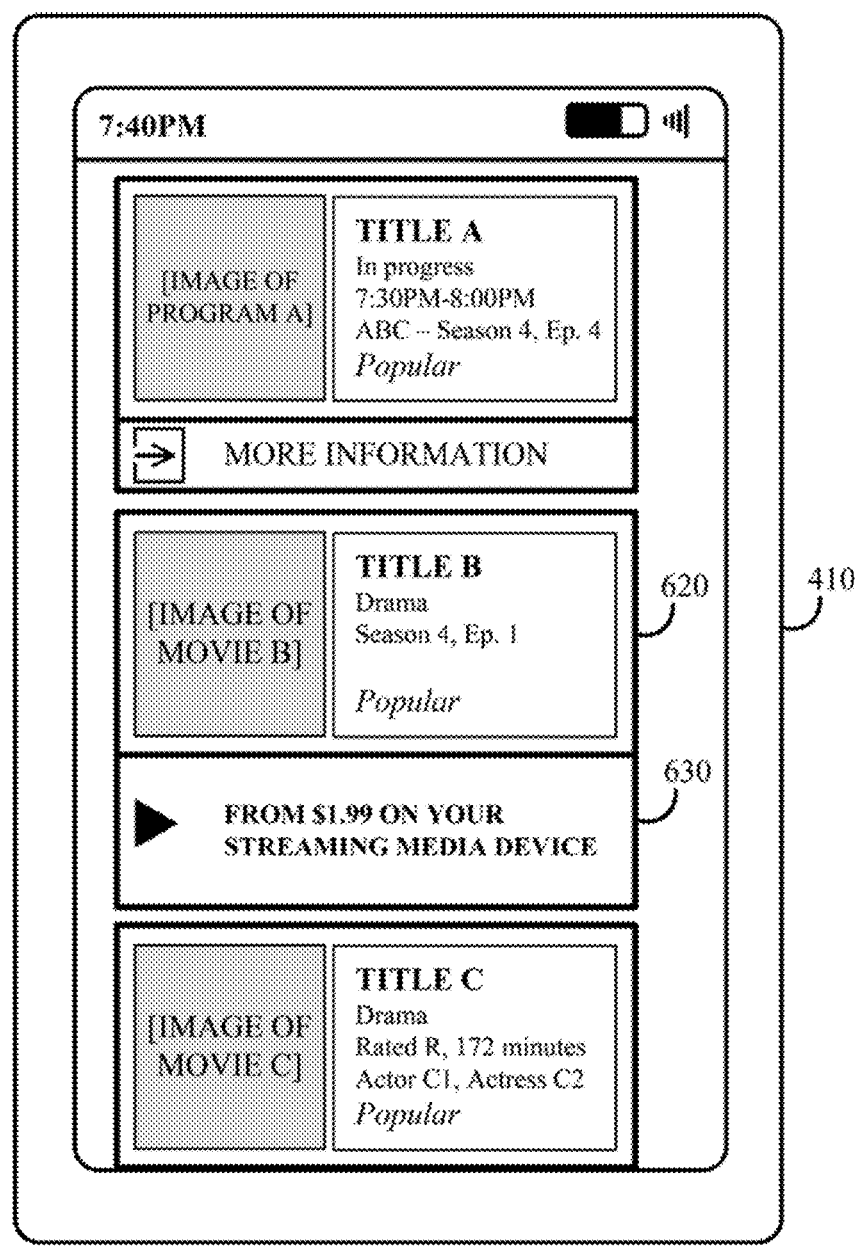
FIG. 6 is an illustrative screen of recommended content items in the form of recommendation interfaces, where content availability information that indicates that the media content item is available using a media streaming device is provided with a recommended content item, in accordance with some implementations of the disclosed subject matter.

In response to detecting a media device, such as a streaming media device, recommendation interfaces that include media content items that are available from such a media device. For example, FIG. 6 shows an illustrative screen of recommended content items in the form of recommendation interfaces, where content availability information that indicates that the media content item is available using a streaming media device is provided with a recommended content item, in accordance with some implementations of the disclosed subject matter. As shown, recommendation interface 620 for a particular movie (e.g., movie B) is presented with option 630 that indicates that the media content item can be provided on a streaming media device connected to the computing device in response to purchasing the media content item. In response to selecting option 630, the client application can direct the streaming media device to purchase the media content item and initiate playback of the media content item on a display device connected to the streaming media device.

In some implementations, a lure interface that provides multiple recommended media content items can be presented to the user. For example, the processes described herein can determine multiple media content items for recommendation to the user that are each available from one or more content sources. In response, a lure interface can be generated that aggregates multiple recommended media content items for selection by the user. This can, for example, provide the user with a preview of media content items to watch.

Figure 7:
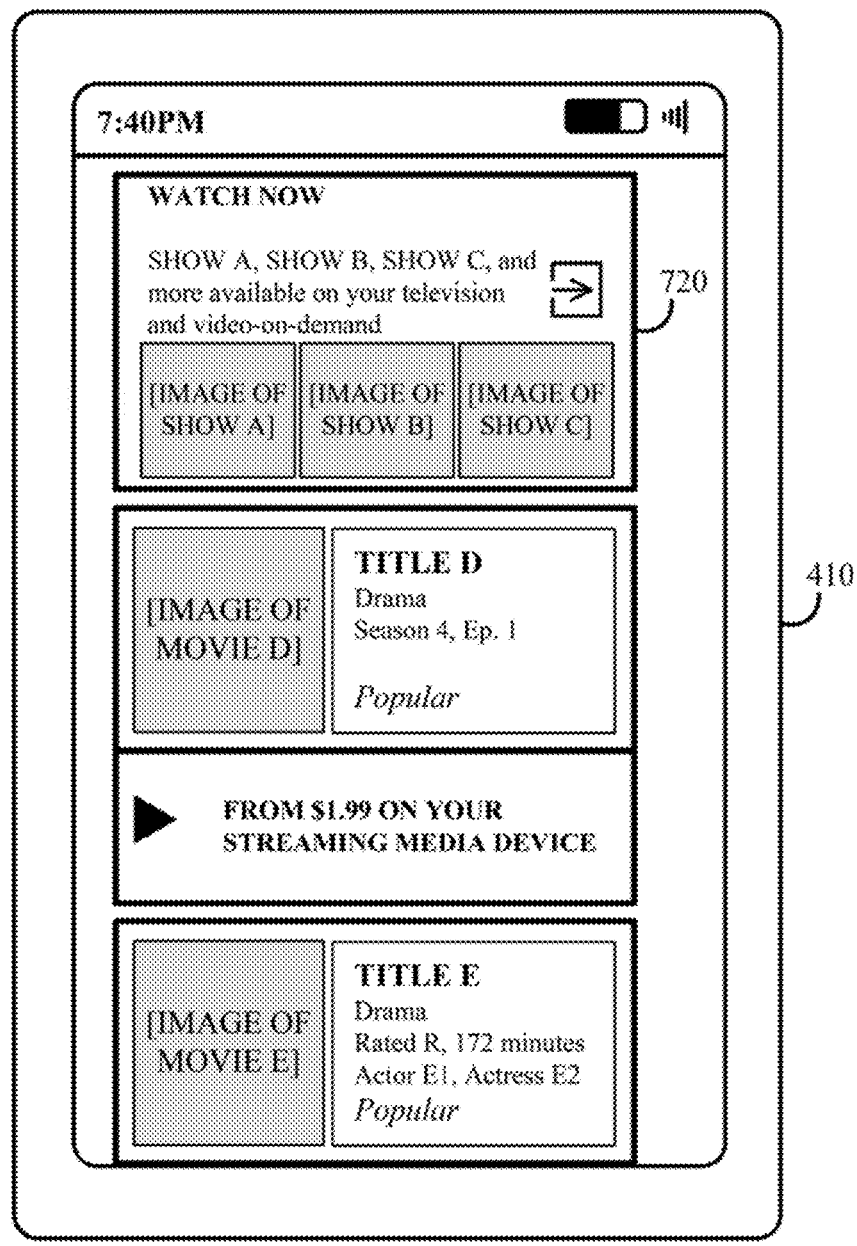
FIG. 7 is an illustrative screen of recommended content items in the form of recommendation interfaces, which includes a lure interface having multiple recommended content items for selection, in accordance with some implementations of the disclosed subject matter.

For example, FIG. 7 shows an illustrative screen of recommended content items in the form of recommendation interfaces, which includes a lure interface having multiple recommended content items for selection, in accordance with some implementations of the disclosed subject matter. In particular, FIG. 7 shows a "WATCH NOW" interface that includes information relating to Show A, Show B and Show C.

It should be noted that, as described above, this can be presented in response to a query from the user. For example, the user can indicate a desire to "watch something now" and, in response, a lure interface can be generated that includes recommended content items that are available for immediate consumption on the computing device or media devices connected to the computing device. Additionally, timing parameters can be extracted from the query to generate the lure interface. For example, the query can indicate a desire to "watch something tonight" or "watch something this weekend" and, in response, the lure interface can be generated for a particular time. Additionally, location parameters can be extracted from the query to generate the lure interface. For example, the query can indicate a desire to "stay at home" or "watch now" and, in response, the lure interface can be generated based on location information (e.g., current location information or location information relating to a user's home location).

Additionally or alternatively, a lure interface can be divided such that the multiple recommended content items are placed on separate recommendation interfaces. In some implementations, lure interfaces can be presented separately from recommendation interfaces. For example, a lure interface can be a first interface or a home interface that the user is presented with in response to initiating the client application. In response to selecting a portion of the lure interface, one or more recommendation cards or recommendation interfaces relating to the recommended media content items in the lure interface can then be presented to the user.

It should be noted that, although the implementations described herein generally show recommendation interfaces with recommended media content items, this is merely illustrative. Any suitable recommended item corresponding to any suitable topic can also be provided. For example, a set of recommendation cards or interfaces can include a lure card with recommended media content items, a weather card with current or forecasted weather at a user's location, and a map card with traffic information at a user's location. It should also be noted that these cards or interfaces can includes any suitable images, icons, graphics, videos, animations, sounds, haptic feedback, or any other suitable accompanying element.

Figure 8:
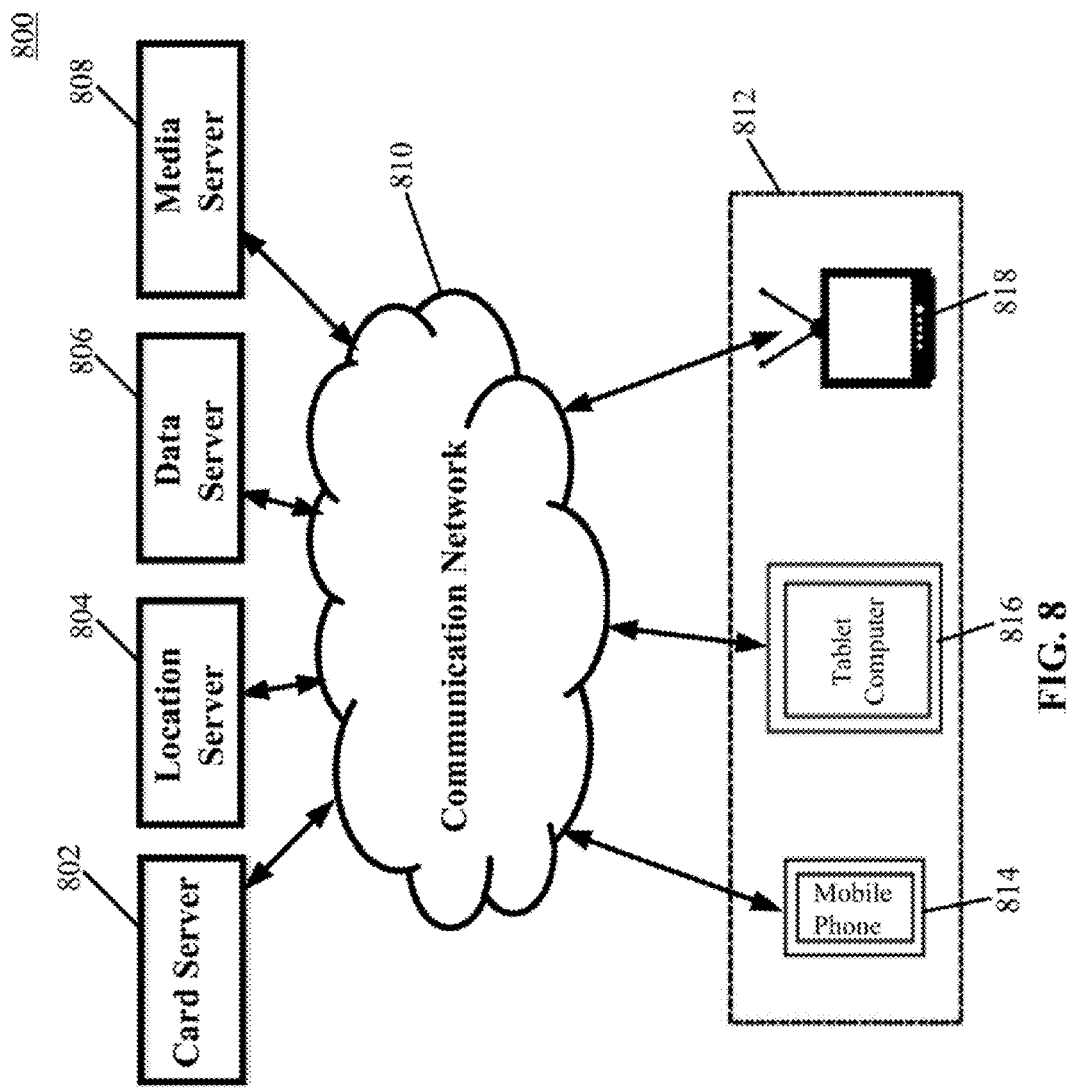
FIG. 8 shows a schematic diagram of hardware that can be used in accordance with some implementations.

Turning to FIG. 8, an example 800 of hardware that can be used in accordance with some implementations is shown. As illustrated, hardware 800 can include a card server 802, a location server 804, a data server 806, a media server 808, a communication network 810, and one or more user devices 812, such as a mobile phone 814, a tablet computer 816, and/or a television 818.

Card server 802 can be any suitable server for storing cards or parameters associated with cards and for presenting cards to a user device 812 in some implementations. For example, card server 802 can store parameters associated with the appearance of cards (e.g., colors, images, icons, or any other suitable parameters). Additionally or alternatively, card server 802 can deliver or present cards to a user device 812 via communication network 810. In some implementations, card server 802 can be omitted. In some implementations, cards and/or parameters associated with cards can be stored on and delivered from memory on user device 812.

Location server 804 can be any suitable server for determining, storing, and delivering information related to the location of a user device 812 in some implementations. For example, location server 804 can determine and store the location of a user device 812 via communication with a Global Positioning System (GPS) device on the user device. As another example, location server 804 can provide the location of a user device 812 via communication network 810 when queried. In some implementations, location server 804 can be omitted.

Data server 806 can be any suitable server for storing and delivering data relating to a user's preferences, a user's past actions, aggregate group data, or any other suitable data. For example, the data can include information regarding a user's preferred media content (determined either from preferences explicitly stated by the user or inferred based on a user's past choices), aggregate group preferences for media content (e.g., ratings, reviews, or any other indicator of group preferences), information relating to when a user prefers to watch media content, information relating to media content which is currently being discussed on one or more social networks, or any other suitable information. Data stored on data server 806 can be accessed when determining which media content item to recommended to a user and when determining which content source or sources to provide the recommended media content item by any suitable process, for example, processes 100, 200, and 300, as shown in and described in connection with FIGS. 1-3.

Media server 808 can be any suitable server for storing media content and delivering the content from a content source to a user device 108 in some implementations. For example, media server 808 can be a server that streams media content to user device 812 via communication network 810. Media content provided by media server 808 can be any content suitable to be suggested to a user, such as video content, audio content, television programs, movies, cartoons, music, sound effects, audiobooks, streaming live content (e.g., a streaming radio show, a live concert, or any other streaming live content), or any other suitable media content. In some implementations, media server 808 can be omitted. In some implementations, media content can additionally or alternatively be delivered from memory on user device 812.

Communication network 810 can be any suitable combination of one or more wired and/or wireless networks in some implementations. For example, communication network 810 can include any one or more of the Internet, a mobile data network, a satellite network, a local area network, a wide area network, a telephone network, a cable television network, a WiFi network, a WiMax network, and/or any other suitable communication network.

User devices 812 can include any one or more user devices suitable for receiving suggestions of media content. For example, in some implementations, user devices 812 can include mobile devices, such as a mobile phone 814, a tablet computer 816, a laptop computer, a vehicle (e.g., car, boat, airplane, or any other suitable vehicle) entertainment system, a portable media player, or any other suitable mobile device. As another example, in some implementations, user devices 812 can include non-mobile devices such as a desktop computer, a set-top box, a television 818, a streaming media player, a game console, or any other suitable non-mobile device.

Although card server 802, location server 804, data server 806, and media server 808 are illustrated as separate devices, any one or more of these devices can be combined into one device in some implementations. Also, although only one each of card server 802, location server 804, data server 806, and media server 808 are shown in FIG. 8 to avoid over-complicating the figure, any suitable one or more of each device can be used in some implementations.

Although three user devices 814, 816, and 818 are shown in FIG. 8 to avoid over-complicating the figure, any suitable number of each of these devices, and any suitable types of these devices, can be used in some implementations.

Figure 9:
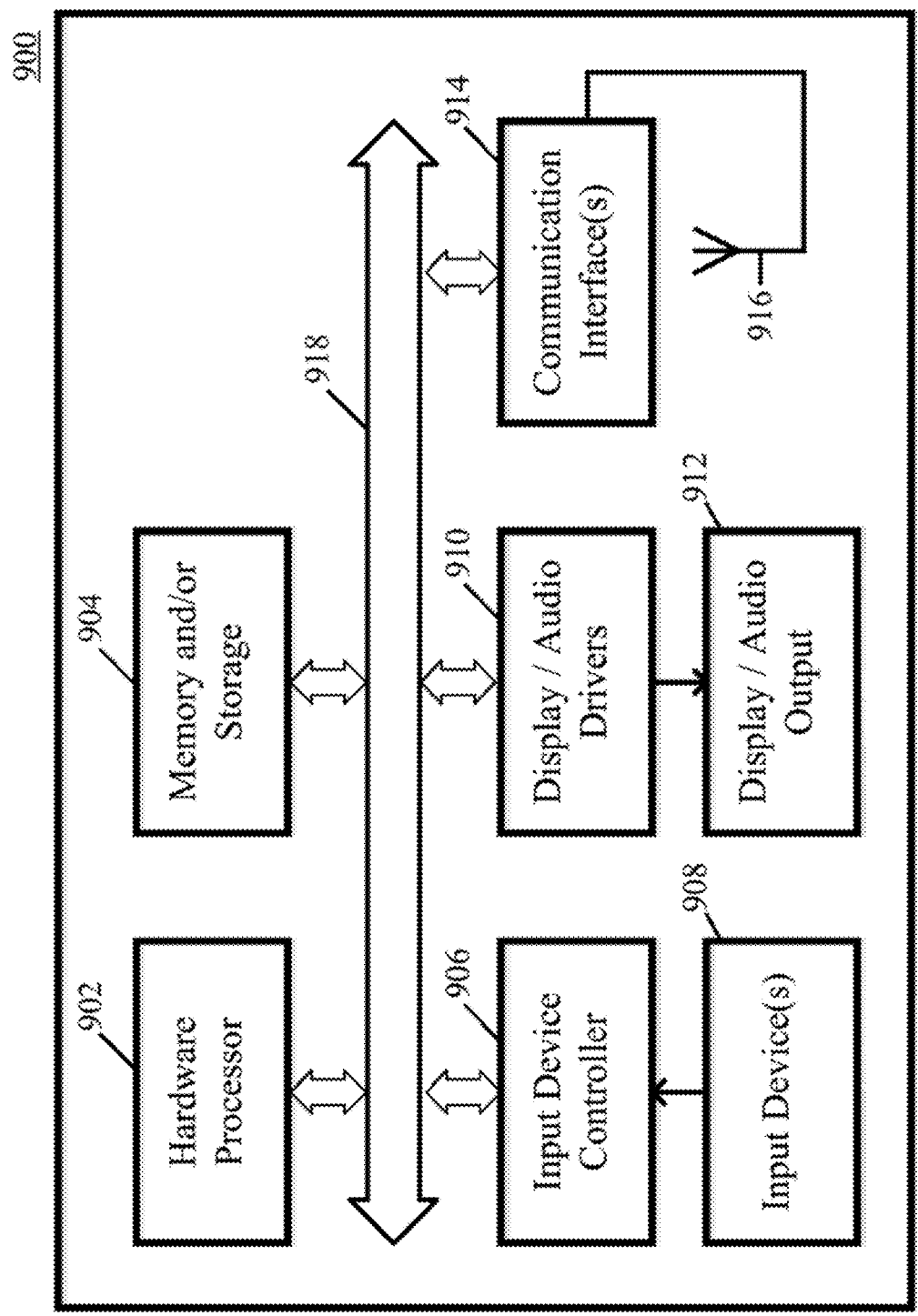
FIG. 9 shows an example of hardware that can be used in a server and/or a user device in accordance with some implementations.

Card server 802, location server 804, data server 806, media server 808, and user devices 812 can be implemented using any suitable hardware in some implementations. For example, in some implementations, devices 802, 804, 806, 808, and 812 can be implemented using any suitable general purpose computer or special purpose computer. For example, mobile phone 814 may be implemented using a special purpose computer. Any such general purpose computer or special purpose computer can include any suitable hardware. For example, as illustrated in example hardware 900 of FIG. 9, such hardware can include hardware processor 902, memory and/or storage 904, an input device controller 906, an input device 908, display/audio drivers 910, display and audio output circuitry 912, communication interface(s) 914, an antenna 916, and a bus 918.

Hardware processor 902 can include any suitable hardware processor, such as a microprocessor, a micro-controller, digital signal processor(s), dedicated logic, and/or any other suitable circuitry for controlling the functioning of a general purpose computer or a special purpose computer in some implementations.

Memory and/or storage 904 can be any suitable memory and/or storage for storing programs, data, media content, and/or any other suitable information in some implementations. For example, memory and/or storage 904 can include random access memory, read-only memory, flash memory, hard disk storage, optical media, and/or any other suitable memory.

Input device controller 906 can be any suitable circuitry for controlling and receiving input from one or more input devices 908 in some implementations. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 910 can be any suitable circuitry for controlling and driving output to one or more display/audio output circuitries 912 in some implementations. For example, display/audio drivers 910 can be circuitry for driving an LCD display, a speaker, an LED, or any other type of output device.

Communication interface(s) 914 can be any suitable circuitry for interfacing with one or more communication networks, such as network 810 as shown in FIG. 8. For example, interface(s) 914 can include network interface card circuitry, wireless communication circuitry, and/or any other suitable type of communication network circuitry.

Antenna 916 can be any suitable one or more antennas for wirelessly communicating with a communication network in some implementations. In some implementations, antenna 916 can be omitted when not needed.

Bus 918 can be any suitable mechanism for communicating between two or more components 902, 904, 906, 910, and 914 in some implementations.

Any other suitable components can be included in hardware 900 in accordance with some implementations.

Components of hardware 900 can be used to execute the blocks of processes 100, 200, and 300 of FIGS. 1, 2, and 3. For example, a user device 812 can transmit a query that requests card(s) with recommended media content items to present to a user by sending a signal via communication network 810 to an external device (e.g., card server 802). Similarly, once cards with recommended media content items are created, card server 802 can transmit the created cards to a user device 812 via communication network 810. As another example, cards or other interfaces can be stored in memory 904 of a user device.

It should be understood that at least some of the above described blocks of the processes of FIGS. 1, 2, and 3 can be executed or performed in any order or sequence not limited to the order and sequence shown and described in the figures. Also, some of the above blocks of the processes of FIGS. 1, 2, and 3 can be executed or performed substantially simultaneously where appropriate or in parallel to reduce latency and processing times.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, or any other suitable magnetic media), optical media (such as compact discs, digital video discs, Blu-ray discs, or any other suitable optical media), semiconductor media (such as flash memory, electrically programmable read-only memory (EPROM), electrically erasable programmable read-only memory (EEPROM), or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting recommended media content items are provided.

Although the invention has been described and illustrated in the foregoing illustrative implementations, it is understood that the present disclosure has been made only by way of example, and that numerous changes in the details of the implementation of the invention can be made without departing from the spirit and scope of the invention, which is limited only by the claims that follow. Features of the disclosed implementations can be combined and rearranged in various ways.

What is claimed is:

1. A method for providing media guidance, the method comprising:
   receiving a query including a plurality of words from a user;
   determining that a first one or more of the plurality of words belongs to a first predetermined category of words that imply a location associated with the user;
   determining that a second one or more of the plurality of words belongs to a second predetermined category of words that imply a time;
   determining that a third one or more of the plurality of words belongs to a third predetermined category of words that imply a device associated with the user;
   extracting a search term that includes the one or more of the plurality of words corresponding to the implied location associated with the user, the implied time, and the implied device associated with the user, from the plurality of words;
   determining, based on the extracted search term, that a plurality of media content items are available at the implied location associated with the user at the implied time via the implied device associated with the user;
   determining popularity information associated with the plurality of media content items and a plurality of content sources, wherein the plurality of media content items are available from one or more of the plurality of content sources;
   selecting a media content item from the plurality of media content items based at least in part on the popularity information associated with each of the plurality of media content items, wherein the selected media content item is available from at least one of the plurality of content sources;
   selecting at least one content source from the plurality of content sources based at least in part on the location associated with the extracted search term and the popularity information associated with each of the plurality of content sources; and
   causing a recommendation interface to be presented to the user, wherein the recommendation interface includes the selected media content item that is provided from the at least one selected content source.

2. The method of claim 1, further comprising:
   ranking the matching media content items based at least in part on the associated popularity information; and
   selecting a subset of the matching media content items based on the ranking.

3. The method of claim 2, wherein the recommendation interface includes the subset of the matching media content items and wherein each of the media content items in the subset of the matching media content items is selectable by the user.

4. The method of claim 1, further comprising determining a subset of the plurality of content sources for providing the selected media content item, wherein the subset of the plurality of content sources includes live content sources that are available to the user based on the implied location and the associated popularity information.

5. The method of claim 1, further comprising determining a subset of the plurality of content sources for providing the selected media content item, wherein the subset of the plurality of content sources includes on-demand content sources that are available to the user based on one or more of the associated popularity information, applications installed on a device associated with the user, and historical information associated with the user.

6. The method of claim 1, further comprising determining a subset of the plurality of content sources for providing the selected media content item, wherein the subset of the plurality of content sources includes on-demand content sources that are available to the user having an external streaming media device.

7. The method of claim 1, further comprising determining a subset of the plurality of content sources for providing the selected media content item, wherein the subset of the plurality of content sources includes on-demand content sources that are available based on applications associated with media devices that are at or near the location information associated with the user.

8. The method of claim 1, wherein the recommendation interface includes one or more recommendation reasons that the media content item was selected for the user.

9. A system for providing media guidance, the system comprising:

a hardware processor that is configured to:
receive a query including a plurality of words from a user;
determine that a first one or more of the plurality of words belongs to a first predetermined category of words that imply a location associated with the user;
determine that a second one or more of the plurality of words belongs to a second predetermined category of words that imply a time;
determine that a third one or more of the plurality of words belongs to a third predetermined category of words that imply a device associated with the user;
extract a search term that includes the one or more of the plurality of words corresponding to the implied location associated with the user, the implied time, and the implied device associated with the user, from the plurality of words;
determine, based on the extracted search term, that a plurality of media content items are available at the implied location associated with the user at the implied time via the implied device associated with the user;
determine popularity information associated with a plurality of media content items and a plurality of content sources, wherein the plurality of media content items are available from one or more of the plurality of content sources;
select a media content item from the plurality of media content items based at least in part on the popularity information associated with each of the plurality of media content items, wherein the selected media content item is available from at least one of the plurality of content sources;
select at least one content source from the plurality of content sources based at least in part on the location associated with the extracted search term and the popularity information associated with each of the plurality of content sources; and
cause a recommendation interface to be presented to the user, wherein the recommendation interface includes the selected media content item that is provided from the at least one selected content source.

10. The system of claim 9, wherein the hardware processor is further configured to:
rank the matching media content items based at least in part on the associated popularity information; and
select a subset of the matching media content items based on the ranking.

11. The system of claim 9, wherein the recommendation interface includes the subset of the matching media content items and wherein each of the media content items in the subset of the matching media content items is selectable by the user.

12. The system of claim 9, wherein the hardware processor is further configured to determine a subset of the plurality of content sources for providing the selected media content item and wherein the subset of the plurality of content sources includes live content sources that are available to the user based on the implied location and the associated popularity information.

13. The system of claim 9, wherein the hardware processor is further configured to determine a subset of the plurality of content sources for providing the selected media content item and wherein the subset of the plurality of content sources includes on-demand content sources that are available to the user based on one or more of the associated popularity information, applications installed on a device associated with the user, and historical information associated with the user.

14. The system of claim 9, wherein the hardware processor is further configured to determine a subset of the plurality of content sources for providing the selected media content item and wherein the subset of the plurality of content sources includes on-demand content sources that are available to the user having an external streaming media device.

15. The system of claim 9, wherein the hardware processor is further configured to determine a subset of the plurality of content sources for providing the selected media content item, wherein the subset of the plurality of content sources includes on-demand content sources that are available based on applications associated with media devices that are at or near the location information associated with the user.

16. The system of claim 9, wherein the recommendation interface includes one or more recommendation reasons that the media content item was selected for the user.

17. A non-transitory computer-readable medium containing computer executable instructions that, when executed by a processor, cause the processor to perform a method for providing media guidance, the method comprising:
determining that a first one or more of the plurality of words belongs to a first predetermined category of words that imply a location associated with the user;
determining that a second one or more of the plurality of words belongs to a second predetermined category of words that imply a time;
determining that a third one or more of the plurality of words belongs to a third predetermined category of words that imply a device associated with the user;
receiving a query including a plurality of words from a user;
that includes the one or more of the plurality of words corresponding to the implied location associated with the user, the implied time, and the implied device associated with the user, from the plurality of words;
determining, based on the extracted search term, that a plurality of media content items are available at the implied location associated with the user at the implied time via the implied device associated with the user;
determining popularity information associated with the plurality of media content items and a plurality of content sources, wherein the plurality of media content items are available from one or more of the plurality of content sources;
selecting a media content item from the plurality of media content items based at least in part on the popularity information associated with each of the plurality of media content items, wherein the selected media content item is available from at least one of the plurality of content sources;
selecting at least one content source from the plurality of content sources based at least in part on the location associated with the extracted search term and the popularity information associated with each of the plurality of content sources; and
causing a recommendation interface to be presented to the user, wherein the recommendation interface includes the selected media content item that is provided from the at least one selected content source.

18. The non-transitory computer-readable medium of claim 17, wherein the method further comprises:

ranking the matching media content items based at least in part on the associated popularity information; and selecting a subset of the matching media content items based on the ranking.

19. The non-transitory computer-readable medium of claim 18, wherein the recommendation interface includes the subset of the matching media content items and wherein each of the media content items in the subset of the matching media content items is selectable by the user.

20. The non-transitory computer-readable medium of claim 17, wherein the method further comprises determining a subset of the plurality of content sources for providing the selected media content item, wherein the subset of the plurality of content sources includes live content sources that are available to the user based on the implied location and the associated popularity information.

21. The non-transitory computer-readable medium of claim 17, wherein the method further comprises determining a subset of the plurality of content sources for providing the selected media content item, wherein the subset of the plurality of content sources includes on-demand content sources that are available to the user based on one or more of the associated popularity information, applications installed on a device associated with the user, and historical information associated with the user.

22. The non-transitory computer-readable medium of claim 17, wherein the method further comprises determining a subset of the plurality of content sources for providing the selected media content item, wherein the subset of the plurality of content sources includes on-demand content sources that are available to the user having an external streaming media device.

23. The non-transitory computer-readable medium of claim 17, wherein the method further comprises determining a subset of the plurality of content sources for providing the selected media content item, wherein the subset of the plurality of content sources includes on-demand content sources that are available based on applications associated with media devices that are at or near the location information associated with the user.

24. The non-transitory computer-readable medium of claim 17, wherein the recommendation interface includes one or more recommendation reasons that the media content item was selected for the user.

* * * * *